US009671942B2

(12) United States Patent
Fleury et al.

(10) Patent No.: US 9,671,942 B2
(45) Date of Patent: Jun. 6, 2017

(54) DYNAMIC USER INTERFACE FOR INHERITANCE BASED AVATAR GENERATION

(75) Inventors: Michel Fleury, Montreal (CA); David Chamandy, Montreal (CA)

(73) Assignee: AUTODESK, INC., San Rafael, CA (US)

(*) Notice: Subject to any disclaimer, the term of this patent is extended or adjusted under 35 U.S.C. 154(b) by 1184 days.

(21) Appl. No.: 12/155,724

(22) Filed: Jun. 9, 2008

(65) Prior Publication Data

US 2008/0309677 A1 Dec. 18, 2008

Related U.S. Application Data

(60) Provisional application No. 60/929,053, filed on Jun. 11, 2007.

(51) Int. Cl.
*G09G 5/00* (2006.01)
*G06F 3/0484* (2013.01)
(Continued)

(52) U.S. Cl.
CPC .......... *G06F 3/04847* (2013.01); *G06T 13/40* (2013.01); *G06T 19/00* (2013.01);
(Continued)

(58) Field of Classification Search
CPC .......... G06T 11/00; G06T 11/60; G06T 19/00; G06T 17/00; A41H 3/007; A63F 13/12;
(Continued)

(56) References Cited

U.S. PATENT DOCUMENTS 6,154,217 A * 11/2000 Aldrich .......................... 345/589
6,227,974 B1 * 5/2001 Eilat et al. ...................... 463/40
(Continued)

FOREIGN PATENT DOCUMENTS

WO WO0159709 A1 8/2001

OTHER PUBLICATIONS

ISA/CA, "*International Search Report*", mailed Aug. 29, 2008, pp. 1 to 3.
Office Action for U.S. Appl. No. 12/155,886 dated Mar. 30, 2011.

*Primary Examiner* — Todd Buttram
(74) *Attorney, Agent, or Firm* — Artegis Law Group, LLP

(57) ABSTRACT

The generation of characters within computer animations is a labor intensive and expensive activity. Whereas prior art approaches have sought to reduce this loading by providing reference avatars, these do not fundamentally overcome the intensive steps in generating these reference avatars, and they provide limited variations to the businesses employing them. Accordingly the invention provides the user with a simple and intuitive mechanism to affect the weightings applied in establishing the physical characteristics of an avatar generated using an inheritance based avatar generator. The inheritance based generator allowing, for example, the user to select a first generation of four grandparents, affect the weightings in generating the second generation parents, and subsequently affect the weightings in generating the third generation off-spring avatar from these parents, therein providing a wide range of avatars from an initially limited set of avatars. Accordingly the invention provides animators with a means of rapidly generating and refining the off-spring avatar to provide the character for their animated audio-visual content.

24 Claims, 12 Drawing Sheets

(51) Int. Cl.
　　　*G06T 13/40*　　　(2011.01)
　　　*G06T 19/00*　　　(2011.01)
(52) U.S. Cl.
　　　CPC .............. *A63F 2300/5553* (2013.01); *A63F 2300/6009* (2013.01); *A63F 2300/8058* (2013.01)
(58) Field of Classification Search
　　　CPC ........ A63F 2300/5553; A63F 2300/407; A63F 2300/8082; H04L 29/06034
　　　USPC ....... 345/473, 594, 581, 619, 629, 630, 639, 345/640, 646, 950, 955; 715/706
　　　See application file for complete search history.

(56) References Cited

U.S. PATENT DOCUMENTS

| | | | |
|---|---|---|---|
| 6,545,682 B1 | 4/2003 | Ventrella et al. | |
| 6,563,503 B1 | 5/2003 | Comair et al. | |
| 7,025,675 B2 * | 4/2006 | Fogel | A63F 13/12 345/473 |
| 7,173,625 B2 | 2/2007 | Nam et al. | |
| 7,574,332 B2 * | 8/2009 | Ballin et al. | 703/2 |
| 7,667,974 B2 * | 2/2010 | Nakatani et al. | 361/760 |
| 7,733,338 B2 * | 6/2010 | Couture-Gagnon | 345/419 |
| 7,840,903 B1 | 11/2010 | Amidon et al. | |
| 7,913,176 B1 * | 3/2011 | Blattner et al. | 715/758 |
| 8,762,625 B2 * | 6/2014 | Post | G06F 3/064 711/103 |
| 2004/0250210 A1 | 12/2004 | Huang et al. | |
| 2005/0026685 A1 | 2/2005 | Ruark et al. | |
| 2006/0195789 A1 | 8/2006 | Rogers et al. | |
| 2006/0294465 A1 | 12/2006 | Ronen et al. | |
| 2007/0087835 A1 * | 4/2007 | Van Luchene | A63F 13/12 463/43 |
| 2007/0123327 A1 | 5/2007 | Van Luchene | |
| 2007/0273711 A1 * | 11/2007 | Maffei | 345/630 |
| 2007/0298866 A1 | 12/2007 | Gaudiano et al. | |
| 2008/0147424 A1 | 6/2008 | Rowan et al. | |
| 2010/0118025 A1 | 5/2010 | Smith et al. | |

\* cited by examiner

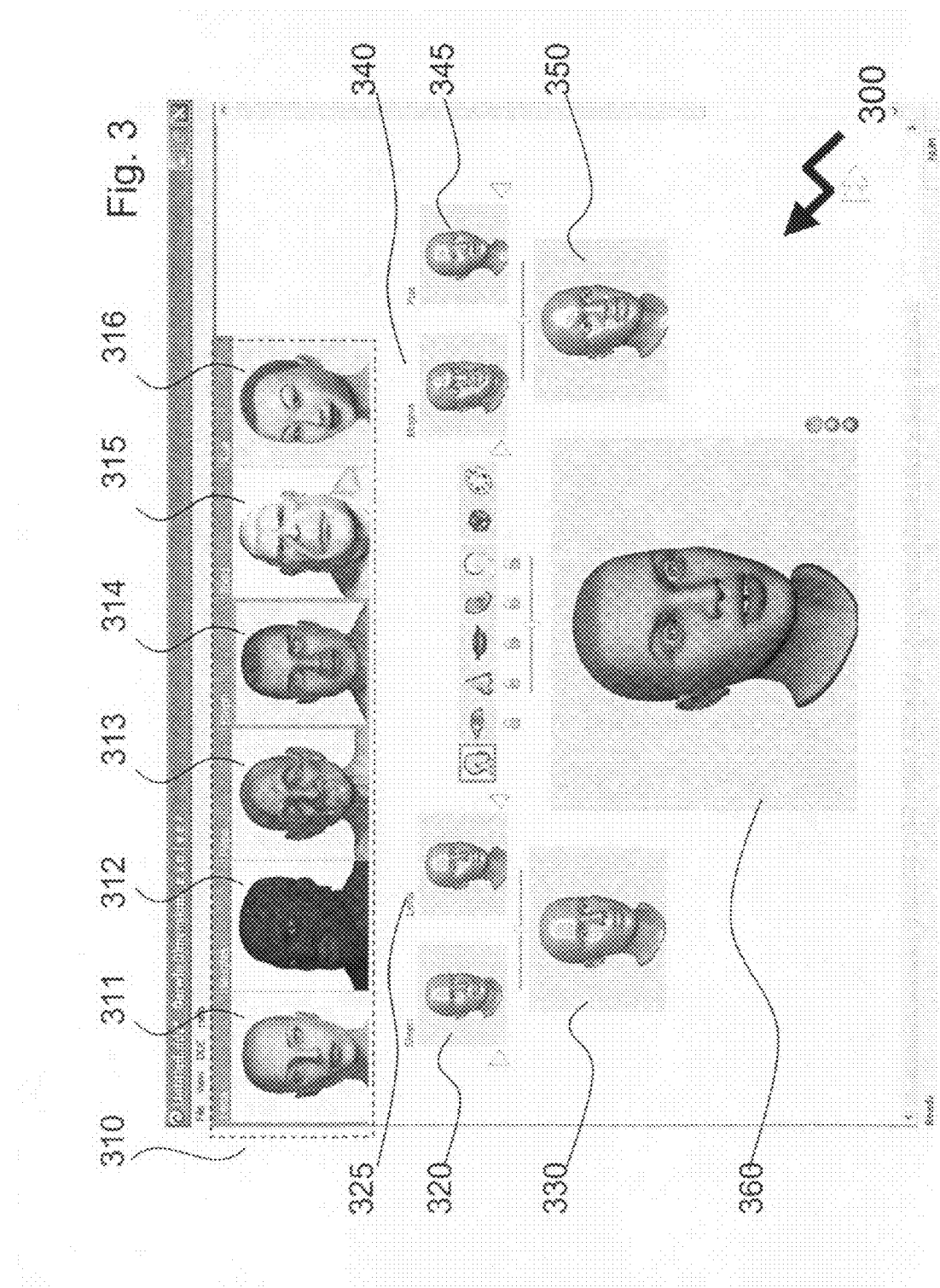

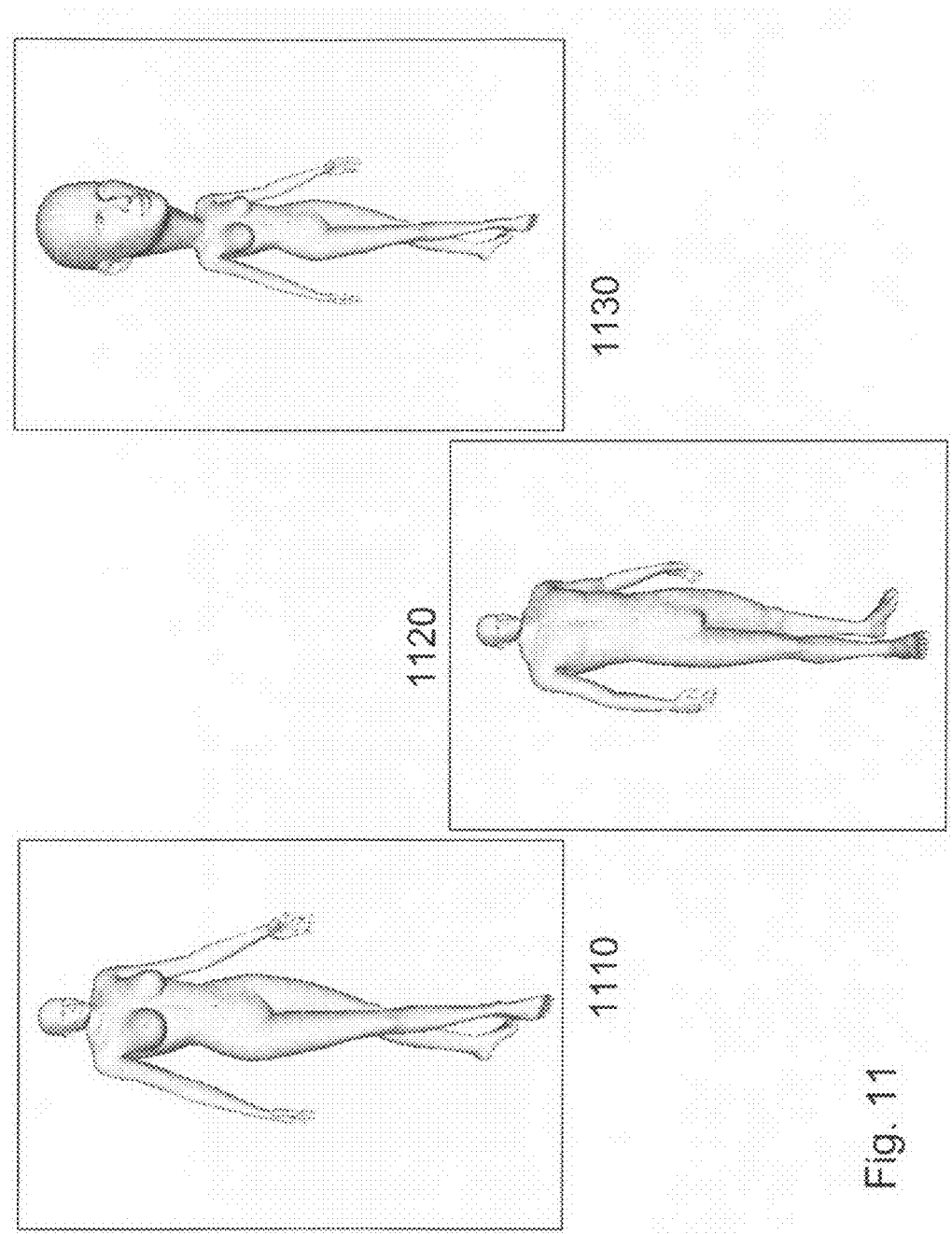

DYNAMIC USER INTERFACE FOR INHERITANCE BASED AVATAR GENERATION

This application claims the benefit of U.S. Provisional Application No. 60/929,053 filed on Jun. 11, 2007, the entire content of which is incorporated herein by reference.

FIELD OF THE INVENTION

The invention relates to computer graphics and more particularly to computer character generation for use in animation.

BACKGROUND

Computer animation, the art of creating moving images via the use of computers, is a common form of audio-visual presentation, where the provided content ranges from television programming, television advertisements, feature movies, short films, cartoons, music videos, computer games and video games. Further these different forms of computer animation, traditionally presented to the user via a television or within the movie theatre are now presented with, and supported by, a multitude of electronic devices including personal computers (PCs), laptop computers, Personal Digital Assistant (PDA), video game consoles (consoles), handheld game consoles (handhelds), cellular telephones (cellphones), and portable multimedia players.

Economically, such computer animation in the form of physical and online sales represents a global business today of approximately $40 billion in 2006 and expected to grow to over $65 billion by 2010. The dominant segments of this market being computer animated feature films, computer games, console games and handheld games.

In addition to this significant global economic element of "entertainment oriented animation" there is an immense amount of animation generated by individuals and businesses for a wide variety of uses ranging from advertisements, education, etc. Whilst difficult to provide economics, an estimate of the quantity of such material may be estimated from quick searches using Yahoo and Google, within their specific video databases for animations. Such searches return 153,000 and 98,000 animated videos as of Jun. 5, 2007.

In computer animation, commercially available systems are essentially digital successors to the art of stop motion animation of 3D models and frame-by-frame animation of 2D illustrations. Some examples of current animation software include Amorphium®, Art of Illusion®, Poser®, Ray Dream Studio®, Bryce®, Maya®, Blender®, TrueSpace®, Lightwave®, 3D Studio Max®, SoftImage XSI®, Alice®, and Adobe Flash® (2D).

For 3D animations of characters, the characters are modeled on the computer monitor and 3D figures are rigged with a virtual skeleton. For 2D figure animations, separate illustrations and separate transparent layers are used, with or without a virtual skeleton. Then the limbs, eyes, mouth, clothes, etc. of the figure are moved by the animator on key frames. The differences in appearance between key frames are automatically calculated by the computer in a process known as tweening or morphing. Finally, the animation is rendered, the rendering providing the features of the skin, clothing, etc.

It would be apparent that within the thousands of different computer game titles and tens of thousands of different animated videos that a significant amount of work is expended in generating the virtual skeletons, providing the character models, and rendering the physical forms of the characters. Presently, this is typically done by specialised artists. This has a corresponding cost to a studio or animator in producing the audio-visual content with computer animation. These costs increase essentially linearly with the number of characters, as they are all generated individually, and with the degree of resolution that is applied in generating the models. For example, characters within background may be modelled and rendered at low resolution, whilst characters in foreground modelled and rendered at high resolution, particularly the main characters. The lower complexity of generating a wide variety of characters such as fantasy characters and cartoon-like humans influences decisions studios, animators and others make in generating their computer animation. Even so the costs of generating computer animated characters are significant and clearly evident when one considers that even animated films with fantasy characters and cartoon-like humans such as "Shark Tale", "Toy Story 2", "Incredibles" and "Finding Nemo" have production costs ranging from US$80 million to over US$100 million per motion picture.

Throughout the remainder of this document the term "avatar" is employed to refer to a computer animated character. Originating from video games, "avatars" are essentially a player's physical computer animated representation in the game world. Typically, a video game offers the player a single avatar or a predetermined limited set of avatars from which to select as the basis of their "player" within the game. As such these avatars have been generated typically in accordance with the process presented supra in respect of skeletons, wire-frames, and rendering. Online games such as "Second Life" provide only 12 avatars for the user to select from, whilst video games such as "Alien Arena 2007" (COR Entertainment) offers 11 avatars for the player to base their player upon.

Recently, to reduce the complexity for animators in generating avatars for their audio-visual content, some commercial software suites offer the animator such a library of stock avatars to select from. One such leading commercial software suite being "iClone 2.0" from RealIllusion, which offers 15 base avatars for the animator to select from. Unfortunately, this is very limited.

It would therefore be beneficial to provide a way for an animator to rapidly generate an avatar and manipulate their characteristics. Further, rather than requiring the animator to always envision, provide a skeleton, wire frame and render their avatar completely it would be beneficial to provide a solution offering the animator the ability to start or select a relatively small number of input selections, and provide simple intuitive interfaces allowing them to focus their creative skills on the manipulation and refinement of the avatar, whilst offering them a wide range of potential outcomes.

SUMMARY OF EMBODIMENTS OF THE INVENTION

The instant application hereby incorporates by reference the entire contents of U.S. Provisional Patent Application No. 60/929,053, filed on Jun. 11, 2007.

In accordance with an aspect of the invention there is provided a method comprising providing at least two avatars, each one of the at least two avatars having a different simulated physical appearance that is defined in terms of a plurality of inheritable characteristics; providing a weighting factor for defining a relative contribution of at least one of the plurality of inheritable characteristics from each of the at least two avatars to a simulated physical appearance of an Off-Spring avatar, the weighting factor selected by a user; generating the Off-Spring avatar in dependence upon the plurality of inheritable characteristics of the at least two avatars and the weighting factor; and, storing the Off-Spring avatar on a computer readable storage medium.

In accordance with another aspect of the invention there is provided a method comprising:

(a) providing a current generation of avatars comprising at least two different avatars, each of the at least two different avatars having at least one physical characteristic contributing to a unique simulated physical appearance thereof;

(b) receiving from a user a weighting factor for establishing a weighting in combining the at least one physical characteristic of the at least two different avatars;

(c) executing an inheritance based avatar generation process for generating a next generation avatar, the at least one physical characteristic of the next generation avatar being established in dependence upon the at least one physical characteristic of the at least two different avatars and the weighting factor; and (d) at least one of storing on a computer readable storage medium data relating to the at least one physical characteristic of the next generation avatar and displaying the next generation avatar to the user.

In accordance with another aspect of the invention there is provided a method comprising providing at least two avatars, each one of the at least two avatars having a different simulated physical appearance that is defined in terms of a plurality of inheritable characteristics; providing a weighting factor for defining a relative contribution of each one of the different simulated physical appearances to a simulated physical appearance of an Off-Spring avatar, the weighting factor selected by a user; generating the Off-Spring avatar in dependence upon the different simulated physical appearances of the at least two avatars and the weighting factor; and, storing the Off-Spring avatar on a computer readable storage medium.

In accordance with another aspect of the invention there is provide a method comprising providing a first group of avatars and a second group of avatars, each avatar of the first and second groups of avatars having a simulated physical appearance that is defined in terms of at least an inheritable characteristic; receiving from a user a first weighting factor for establishing a weighting in combining the physical characteristic of the avatars of the first group of avatars; receiving from the user a second weighting factor for establishing a weighting in combining the physical characteristic of the avatars of the second group of avatars; executing an inheritance based avatar generation process for generating a first next generation avatar and a second next generation avatar, the physical characteristic of the first next generation avatar being established in dependence upon the physical characteristic of each avatar of the first group of avatars and the first weighting factor, the physical characteristic of the second next generation avatar being established in dependence upon the physical characteristic of each avatar of the second group of avatars and the second weighting factor; receiving from the user a third weighting factor for establishing a weighting in combining the physical characteristic of the first next generation avatar and the physical characteristic of the second next generation avatar; executing an inheritance based avatar generation process for generating a second generation avatar, the physical characteristic of the second generation avatar being established in dependence upon the physical characteristic of each of the first next generation avatar and the second next generation avatar and the third weighting factor; and, at least one of storing on a computer readable storage medium data relating to the physical characteristic of the second generation avatar and displaying to the user a simulated physical appearance of the second generation avatar.

BRIEF DESCRIPTION OF THE DRAWINGS

Exemplary embodiments of the invention will now be described in conjunction with the following drawings, in which:

FIG. 3 illustrates a three-generation inheritance based avatar generator according to an embodiment of the invention for weighting grandparents for each parent and between parental families;

FIG. 11 illustrates three inheritance based avatars generated using an inheritance based software generator according to an embodiment of the invention to provide dynamic adjustment of the body in the second step.

DETAILED DESCRIPTION OF EMBODIMENTS OF THE INVENTION

Figure 1:
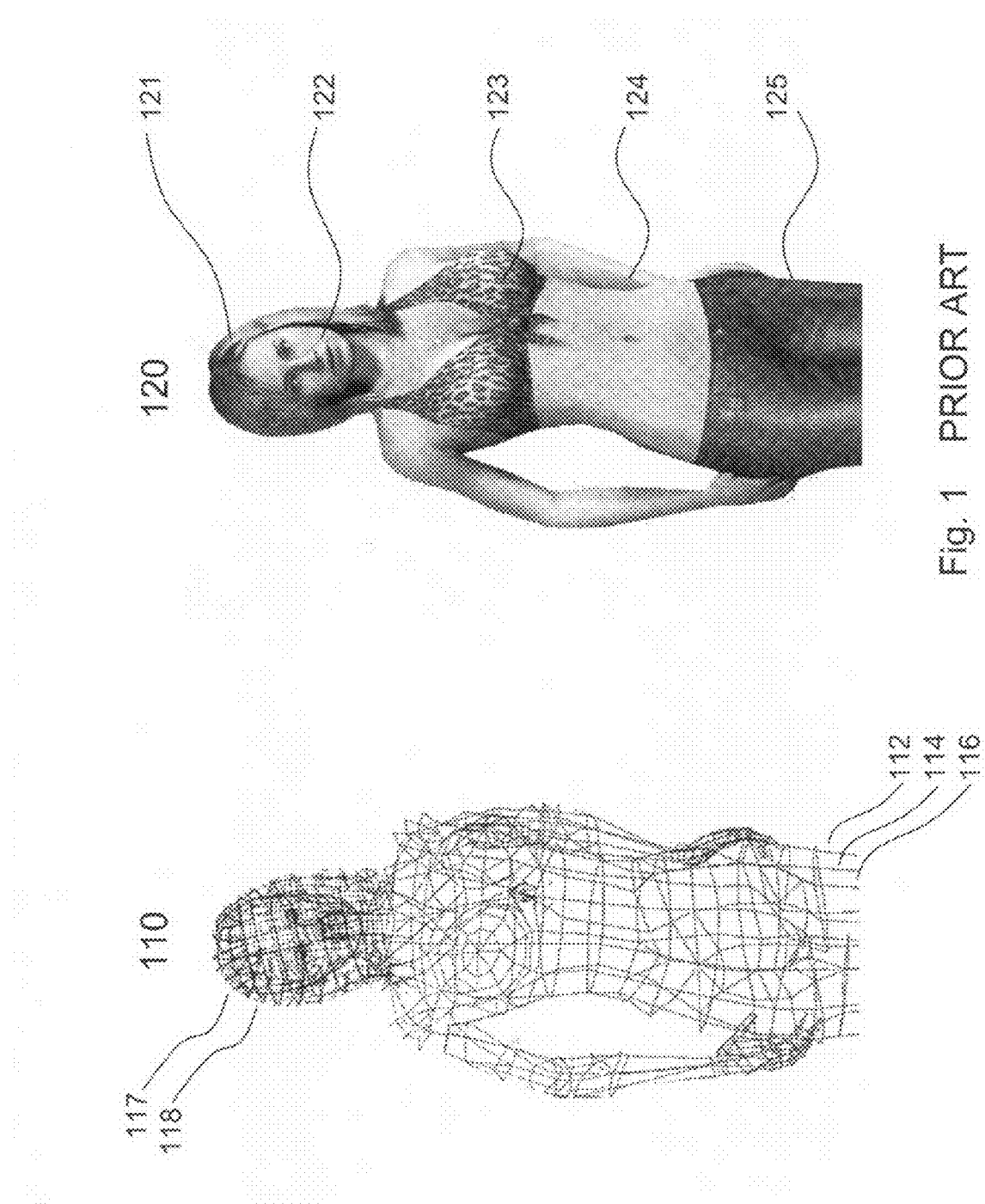
FIG. 1 illustrates a prior art approach to generating an avatar using a wire-frame model and polygon filling.

Referring to FIG. 1 illustrated is a prior art approach to generating an avatar using a wire-frame model 110 and finished model 120. The wire-frame model 110 is typically generated by the avatar programmer and consists of polygons, such as coarse polygons 112 through 116 in regions of general body shape, and fine polygons 117 and 118 in regions of the body requiring more detail. After completing the wire-frame model 110, the avatar programmer selects the fill for the coarse polygons 112 through 116 and fine polygons 117 and 118 according to the clothing and body of the avatar being generated.

As shown, the polygons of wire-frame model 110 are filled according to hair 121, face features 122, bikini top 123, body 124 and trousers 125, therein resulting in the finished model 120. The finished model 120 is then stored by the avatar programmer for use within a video game, computer game or other animated audio-visual content.

Figure 2A:
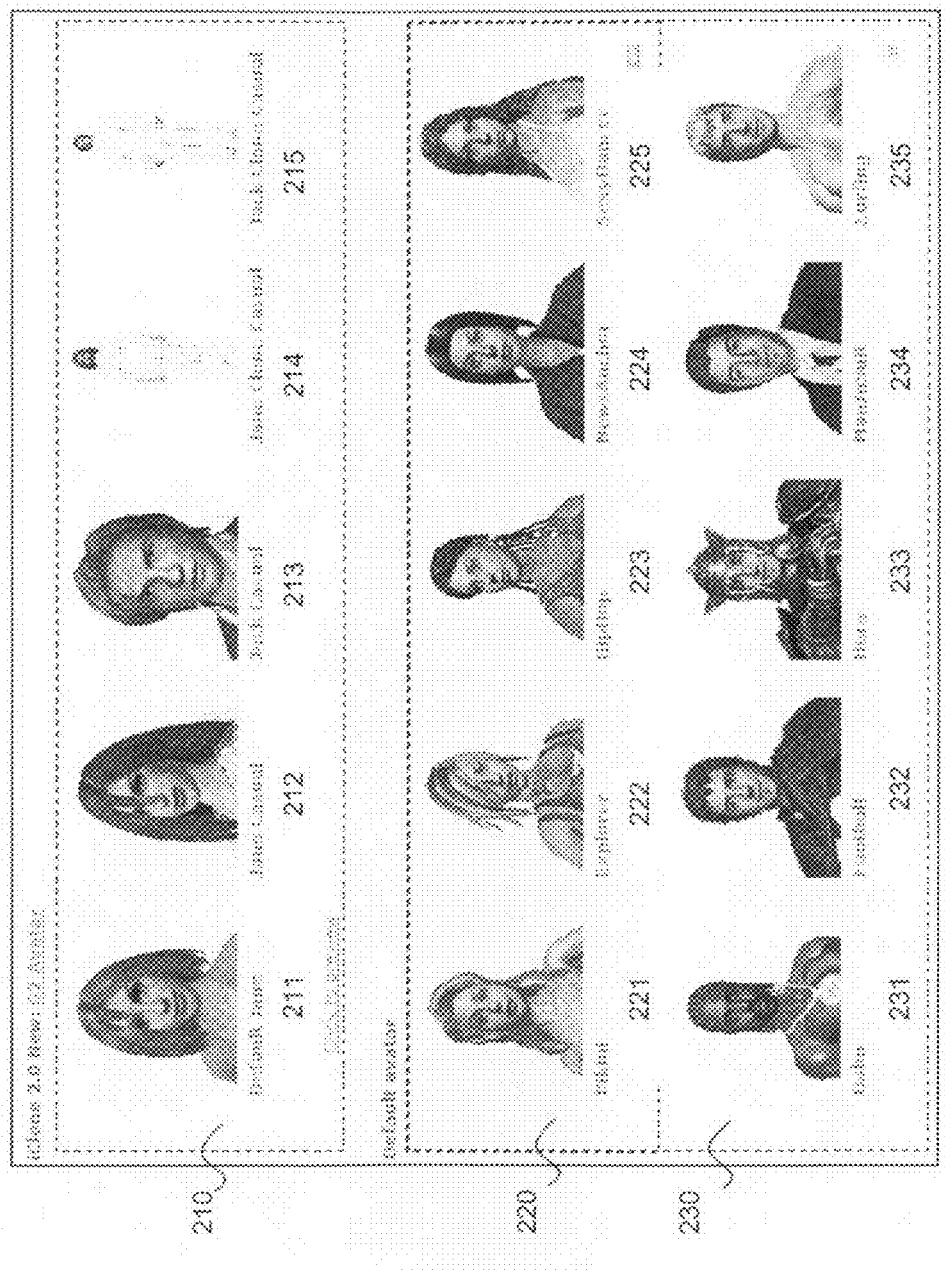
FIG. 2A illustrates a prior art software package providing pre-generated avatars for video game programmers.

With the proliferation of complex video games with detailed story lines and numerous characters, high quality animated films, animated shorts, massively multiplayer on line games, etc., an organization generating such content may not wish to expend its resources; time, financial or physical; in generating avatars. As a result, an industry solution is to purchase pre-designed avatars from an avatar programmer, such as referred to in FIG. 1 generating the finished model 120. An example of an avatar menu 200 is shown in FIG. 2A from the commercial avatar set "iClone 2.0" from iClone Inc. As such the purchaser of the avatar set "iClone 2.0" is presented with an avatar menu 200 comprising three groups, the first being "G2 Avatar" 210, the second "Girl Avatar" 220, and finally "Boy Avatar" 230. Within the "G2 Avatar" 210 group are three complete avatars, similar to finished model 120 of FIG. 1, being "Default Jane" 211, "Jane Casual" 212, and "Jack Casual" 213. Also within the "G2 Avatar" 210 are partially completed avatars "Jane Clone Casual" 214 and "Jack Clone Casual" 215 which have blank clothing but completed heads and facial features.

"Girl Avatar" 220 as shown comprises clothed and completed models, similar to finished model 120 of FIG. 1 using the "Jane" figure as employed in "Default Jane" 211, "Jane Casual" 212 and "Jane Clone Casual" 214. As such shown are "Bikini" 221, "Explorer" 222, "HipHop" 223, "News Anchor" 224, and "Sexy Dancer" 225. Similarly, "Boy Avatar" 230 as shown comprises clothed and completed models, similar to finished model 120 of FIG. 1 using the "Jack" figure as employed in "Default Jack" 213 and "Jack Clone Casual" 215. As such shown are "Dabu" 231, "Football" 232, "Hero" 233, "Man In Suit" 234, and "Surfing" 235. It is apparent to one of skill in the art that in some instances the avatars by being generated from common source avatars, such as "Jane Clone Casual" 214 and "Jack Clone Casual" 215, have not been executed flawlessly, see for example "Surfing" 235.

Figure 2B:
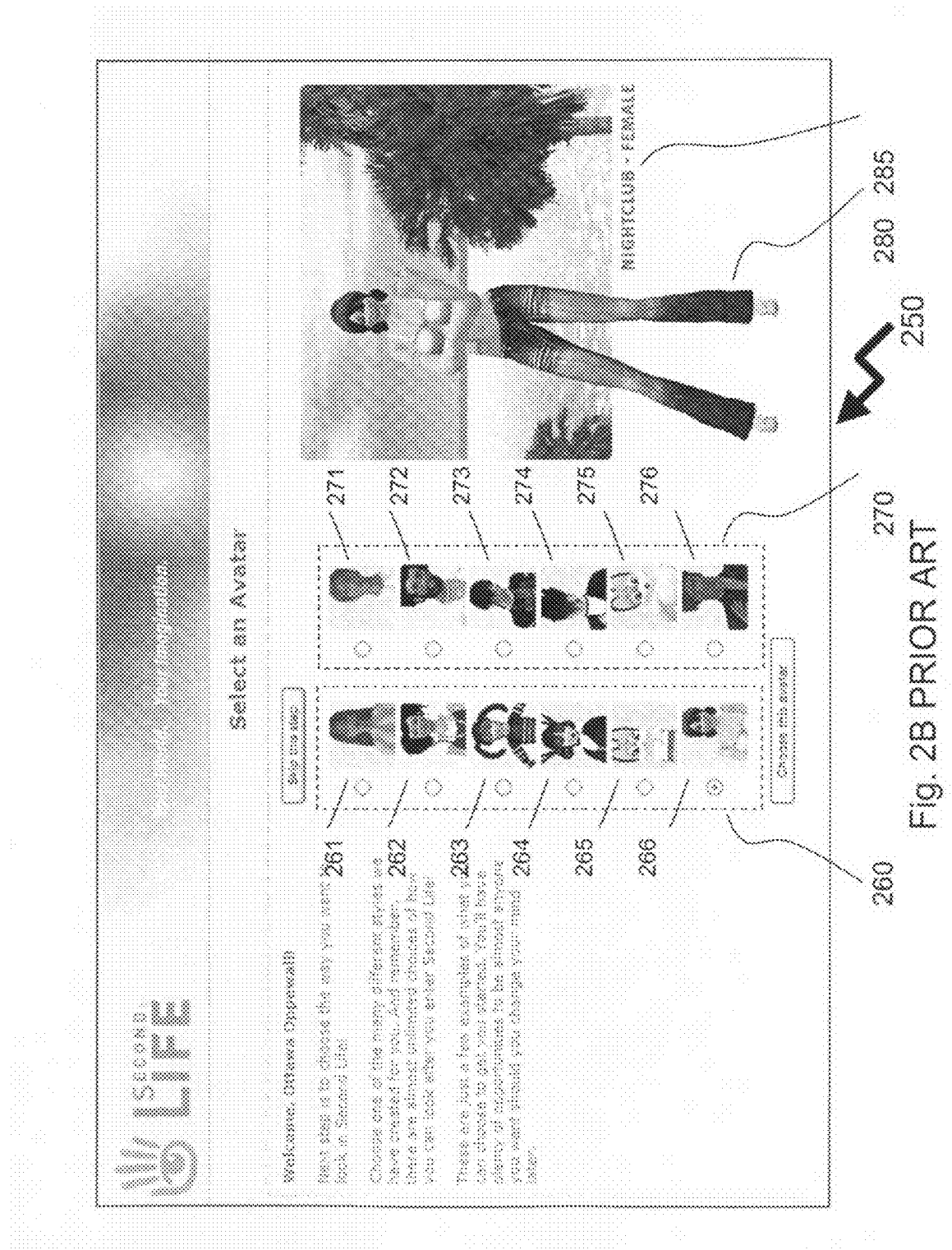
FIG. 2B illustrates a prior art avatar selection page for the online virtual reality environment "Second Life"

A developer of audio-visual content such as a video game or computer game comprising avatars, whether implementing avatars directly, such as discussed supra in respect of FIG. 1, or importing avatars from a commercial library such as presented supra in respect of FIG. 2A, typically provides a user with an avatar selection page 250, such as is shown in FIG. 2B. Avatar selection page 250 is taken from the online virtual reality environment "Second Life," as a specific and non-limiting example. Accordingly, the user is provided with two groups, "Females" 260 comprising female avatars 261 through 266, and "Men" 270 comprising male avatars 271 through 276. In the instant example, the user has selected female avatar 266 from "Females" 260, and the selected female avatar 266 is displayed complete as full FIG. 280 and name "Nightclub-Female". A limitation of the approach presented in avatar selection page 250 is that only 12 avatars are provided to the user for selection, which may not seem overly limiting to one user, but "Second Life" as of May 2007 had over 6 million registered users within the virtual reality environment, approximately 500,000 of each "Female" 261 through 266 and "Male" 271 through 276. It would be beneficial to provide a way of rapidly generating avatars either from the viewpoint of an avatar generator, such as the programmer in FIG. 1 for individual characters, crowds, etc., or users within their gaming environment. It would be further beneficial to allow the individual that is generating the avatar to mimic, and simply adjust, weightings that occur within a genetically derived avatar generator that provides inheritance based development of an avatar. Such a three-generation inheritance based avatar generator 300 according to an embodiment of the invention for weighting grandparents for each parent and between parental families is shown in FIG. 3.

When employing the three-generation inheritance based avatar generator 300 a user selects four grandparents from a pool 310 of avatar characters. Each of the selected avatars has a simulated physical appearance that is defined in terms of a plurality of inheritable characteristics. By way of a specific and non-limiting example, in the three-generation inheritance based avatar generator 300 the avatar characters are "Lena" 311, "MugNa" 312, "Pepe" 313, "Steph" 314, "Todd" 315, and "Xua" 316. In the instant example the user has selected "Steph" 314 as paternal grandfather 320, "Lena" 311 as paternal grandmother 325, "MugNa" 312 as maternal grandfather 340, and "Xua" 316 as maternal grandmother 345. The terms maternal and paternal as employed within the embodiments are to differentiate the two sets of grandparents. As will be evident in respect of the embodiments, selection of both sexes in the parents giving "birth" to the child within a software based inheritance based avatar generator is not necessarily a requirement, although optionally it is set as one. The three-generation inheritance based avatar generator 300 therein generates a second generation comprising "Parent 1" 330, and "Parent 2" 350, each having a simulated physical appearance that is defined in terms of the plurality of inheritable characteristics. Thereafter, a third generation avatar-off-spring 360 of "Parent 1" 330 and "Parent 2" 350 is generated. It is apparent that when embedded within a game, three-generation inheritance based avatar generator 300 provides the user with an additional benefit allowing their avatar to be determined from a plurality of choices and input values rather than a single click of a cursor over one image.

Optionally, introducing the three-generation inheritance based avatar generator 300 into an online virtual reality environment such as "Second Life" as discussed supra in respect of FIG. 2B, allows for expansion of features such as allowing characters to procreate and have offspring, these offspring generated in accordance with predetermined or dynamically associated weightings from the environment, game status etc. Within the embodiment of the three-generation inheritance based avatar generator 300 the user is not required to select "male" characters for paternal grandfather 320 and maternal grandfather 340, and "female" characters for paternal grandmother 325 and maternal grandmother 345. Alternatively the three-generation inheritance based avatar generator 300 places limitations on the characteristics of the avatar characters, such as avatar characters 311 through 316, such as sex, relatives having predetermined relationships, ethnicity, or being human, of defined "alien" race, etc.

Figure 4:
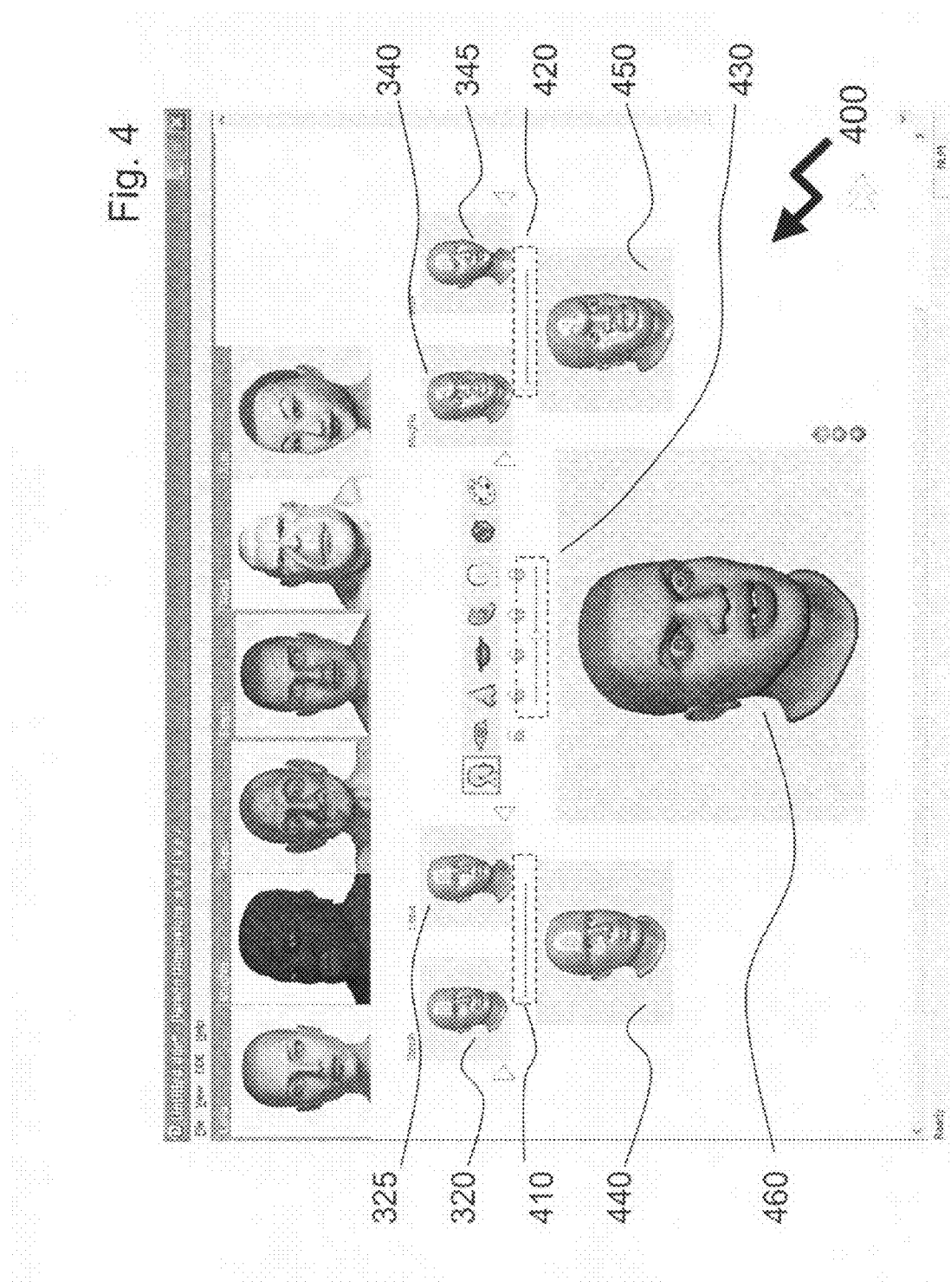
FIG. 4 illustrates the three-generation inheritance based avatar generator of FIG. 3 highlighting the slider-bars according to the invention set to an alternate weighting favoring grandfathers.

Referring now to FIG. 4, illustrated is the three-generation inheritance based avatar generator 400, equivalent to the three-generation inheritance based avatar generator 300 of FIG. 3, highlighting the slider-bars 410 through 430 having an indicating portion being set to an alternate weighting that favors the grandfathers. As such, within the three-generation inheritance based avatar generator 400 the avatar grandparents are "Steph" 314 as paternal grandfather 320, "Lena" 311 as paternal grandmother 325, "MugNa" 312 as maternal grandfather 340, and "Xua" 316 as maternal grandmother 345. In the instant example, the user has moved the paternal slider-bar 410 to the leftmost position, favoring the male grandparent "Steph" 314 on the paternal side, resulting in "Weighted Parent 1" 440. Similarly, maternal slider-bar 420 has been set to its leftmost position, favoring the male grandparent "MugNa" 312 on the maternal side, resulting in "Weighted Parent 2" 450. In this way, the user provides weighting factors for defining a relative contribution of at least one of the plurality of inheritable characteristics from each of the paternal grandparent avatars to a simulated physical appearance of "weighted Parent 1" 440, and for defining a relative contribution of at least one of the plurality of inheritable characteristics from each of the maternal grandparent avatars to a simulated physical appearance of "Weighted Parent 2" 450. The three-generation inheritance based avatar generator 400 uses "Weighted Parent 1" 440 and "Weighted Parent 2" 450 for generating weighted third generation avatar-off-spring 460. In generating the weighted third generation avatar-off-spring 460 the third generation inheritance based avatar generator 400 utilizes a weighting factor provided by a user via family weighting slide-bar 430, for adjusting the weighting applied between "Weighted Parent 1" 440 and "Weighted Parent 2" 450 in determining the simulated physical appearance of avatar-off-spring 460.

Figure 5:
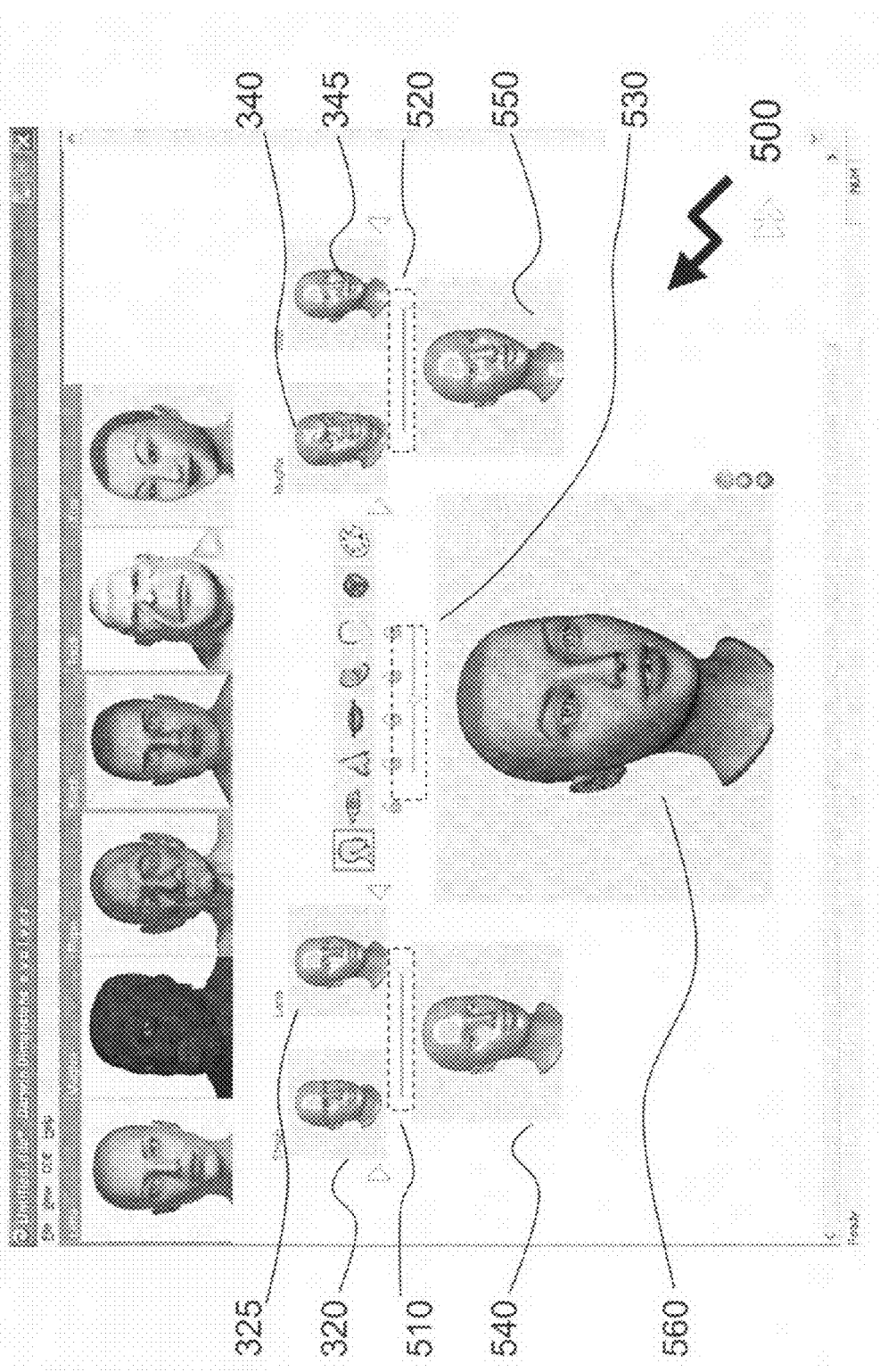
FIG. 5 illustrates the three-generation inheritance based avatar generator of FIG. 3 highlighting the slider-bars according to the invention set to an alternate weighting favoring grandmothers.

Now referring to FIG. 5 illustrated is the three-generation inheritance based avatar generator 500, analogous to three-generation inheritance based avatar generators 300 of FIG. 3 and 400 of FIG. 4. As in these previous avatar generators, the inheritance based avatar generator 500 has avatar grandparents "Steph" 314 as paternal grandfather 320, "Lena" 311 as paternal grandmother 325, "MugNa" 312 as maternal grandfather 340, and "Xua" 316 as maternal grandmother 345. The paternal slider-bar 510 has been moved by the user to the rightmost position, favoring the female grandparent "Lena" 311 on the paternal side, resulting in "Weighted Parent 1" 540. Similarly, maternal slider-bar 520 has been set to rightmost position, favoring the female grandparent "Xua" 316 on the maternal side, resulting in "Weighted Parent 2" 550. In generating the weighted third generation avatar-off-spring 560 the third generation inheritance based avatar generator 500 utilizes family weighting slide-bar 530 to adjust the weighting applied between "Weighted Parent 1" 540 and "Weighted Parent 2" 550.

Figure 6:
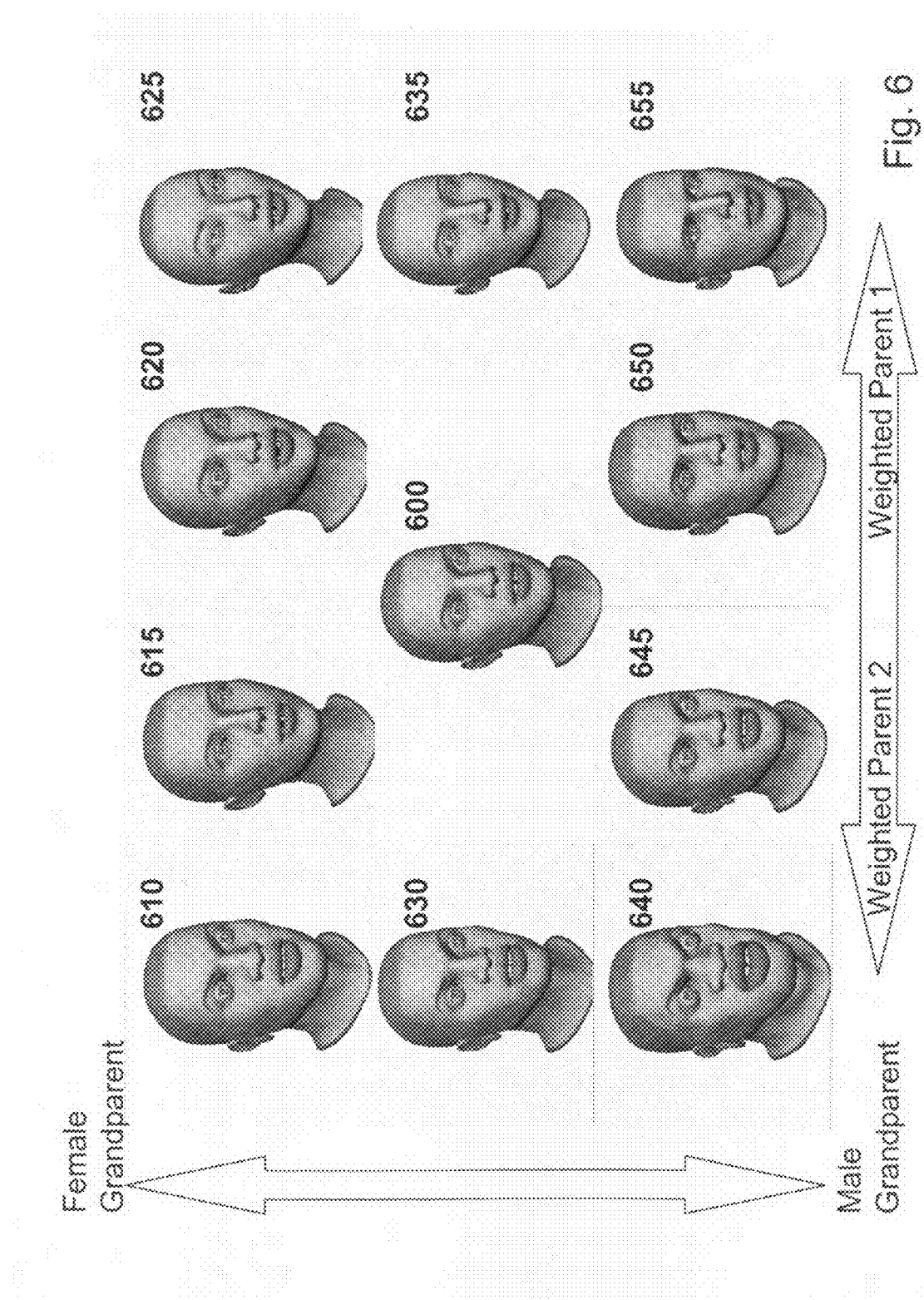
FIG. 6 illustrates different grandchildren avatar heads generated according to varying weightings of grandparents according to an embodiment of the invention.

It is evident therefore that using the different slide-bars within the third generation inheritance based avatar generators, such as 300 of FIG. 3, 400 of FIG. 4 and 500 of FIG. 5, allows the user to weight between parents, and grandparents, generating according to the characteristics of the slide-bars in respect of discrete settings available to the user, and weightings applied from these settings in merging the parents and grandparents. This can be seen in FIG. 6 where a series of avatars 600 through 655 are portrayed representing avatars generated using a third generation inheritance avatar generator 400 with three sliders, paternal slider-bar 410, maternal slider-bar 420, and family weighting slide-bar 460, with each having only 3 settings, full one side, middle, and full other side. The resulting 10 avatars 610 through 655 show a wide range of facial structures using "Steph" 314 as maternal grandfather 340, "MugNa" 312 as paternal grandfather 320, "Lena" 311 as paternal grandmother 325, and "Xua" 316 as maternal grandmother 345.

It is evident that providing each of the three sliders, paternal slider-bar 410, maternal slider-bar 420, and family weighting slide-bar 460, with 3 settings provides 27 off-spring variants from the four grandparents. Simply expanding each slider to 5 settings provides 125 off-spring, and 10 settings gives 1000 off-spring variants. Similarly expanding the number of male grandparents to 4 and number of female grandparents to 4 provides 6 combinations of male grandparents, $P[male]_2^4$, and 6 combinations of female grandparents, $P[female]_2^4$, resulting in 144,000 variants for simple 10 setting sliders. Clearly, such sliders provide a fast, user-friendly manner for an avatar generator utilizing the three-generation inheritance based avatar generator to generate a wide range of characters, for use for example in providing characters in a crowd, or providing a director or producer of audio-visual content with real-time adjustment and refinement of a character, who will for example be a central character within the audio-visual content. The slider or another equivalent control allows the user to provide a weighting factor by selecting a value within an available range of values for at least one of the plurality of inheritable characteristics. In general, the available range of values has a first endpoint corresponding to one of a previous generation of avatars and has a second endpoint corresponding to the other of the previous generation of avatars. For instance, the paternal slider-bar 410 has a first endpoint at the leftmost position thereof corresponding to the male grandparent "Steph" 314, and maternal slider-bar 420 has a first endpoint at the leftmost position thereof corresponding to the male grandparent "MugNa" 312. Similarly, the paternal slider-bar 410 has a second endpoint at the rightmost position thereof corresponding to the female grandparent "Lena" 311, and maternal slider-bar 420 has a second endpoint at the leftmost position thereof corresponding to the female grandparent "Xua" 316. Values intermediate the first and second endpoints correspond to a weighted combination of the previous generation avatars.

Figure 7:
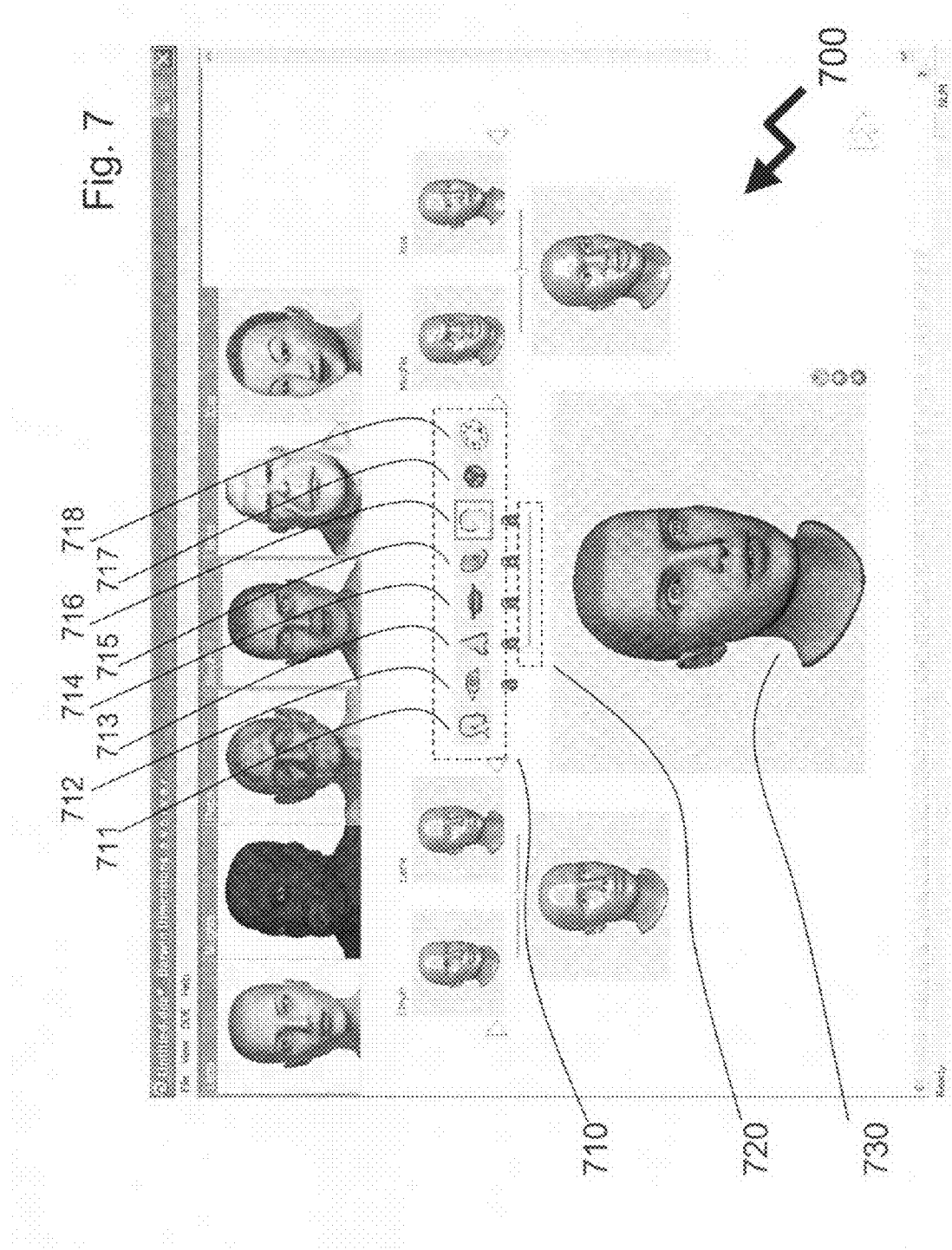
FIG. 7 illustrates an exemplary embodiment of the invention for weighting specific aspects of an inheritance generated avatar.

Such a refinement of a character, once the grandparents and three sliders presented supra are defined is shown as three-generation inheritance based avatar generator 700 in FIG. 7. As shown a feature selector bar 710 is shown comprising of eight feature icons 711 through 718. The first feature icon being "Whole Head" 711, which when selected provides the global avatar modifications as discussed supra in respect of FIGS. 3 through 6, when used in combination with central slider 720. The second feature icon "Eyes" 712 provides refinement of the eyes of the off-spring 730 through use of the central slider 710. Third through sixth feature icons being "Nose" 713, "Mouth" 714, "Ear" 715, and "Cranium" 716. Seventh feature icon "Random" 717 provides a randomization of all grandparents with the various sliders maintained at the levels set manually by the avatar generator. Finally, eighth feature icon "Palette" 718 allows the avatar generator to change the skin palette of the off-spring 720 to that of any one of source characters within the pool 310. For example, "MugNa" 312 is of dark complexion, "Xua" 316 is of light complexion, and "Todd" 315 is colored blue for an alien species. As such simply by selecting the eighth feature icon "Palette" 718, the avatar generator is provided with a second window, not shown for clarity, showing the pool 310 allowing the avatar generator to select the character for the skin tone.

In the three-generation inheritance based avatar generators presented supra the avatar generator was used such that male and female grandparents were selected. Alternatively the "Random" 717 feature allows avatars to be generated without such restrictions, or optionally "Random" 717 applies different predetermined conditions to those within the user-selected operations.

Figure 8:
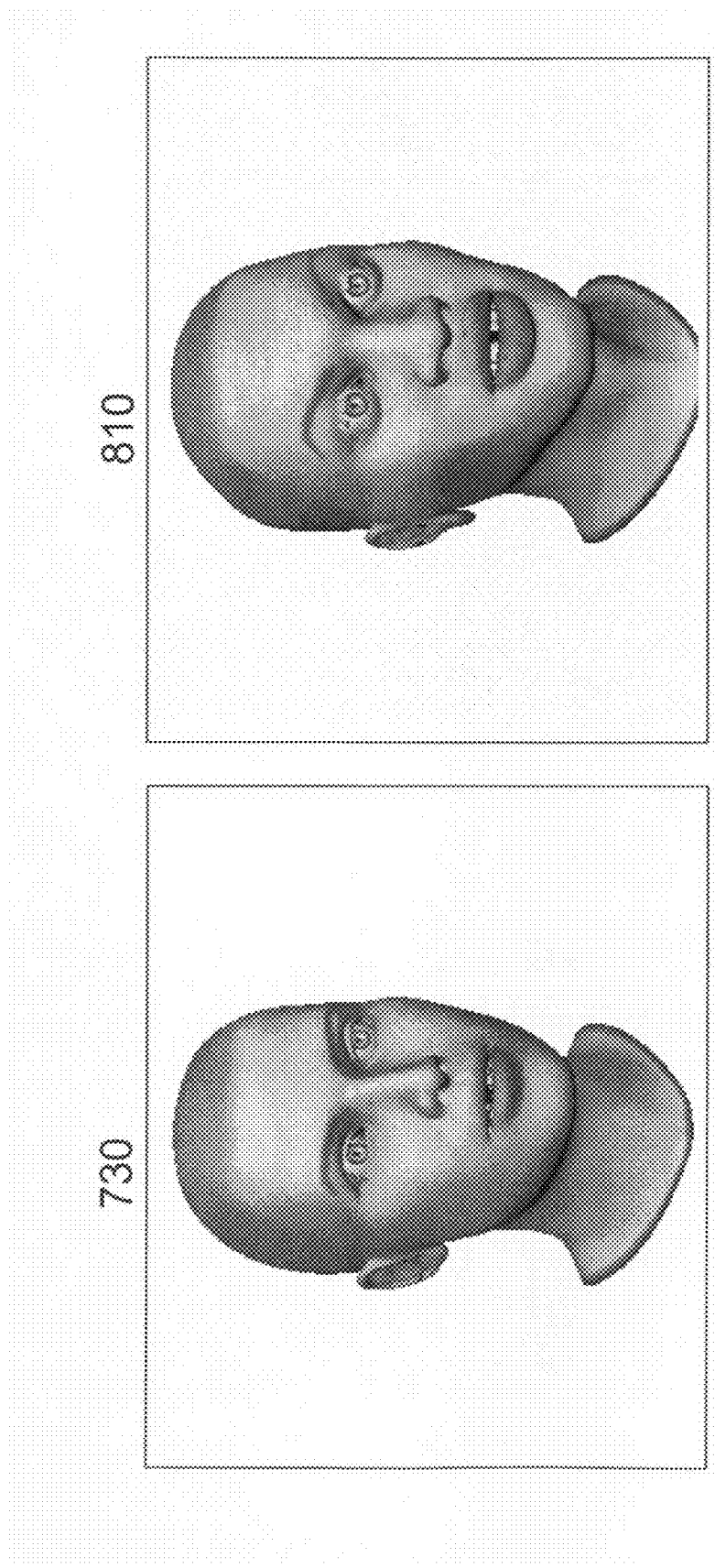
FIG. 8 illustrates two grandchildren from execution of an inheritance generated avatar program according to an embodiment of the invention adjusting the weighting of the cranium.

FIG. 8 illustrates two grandchildren from execution of an inheritance generated avatar program according to an embodiment of the invention wherein the feature icon "Cranium" 716 has been selected and the central slider 720 has been shifted from one side, first off-spring 730, to the other second off-spring 810. As evidenced in this example the cranium is adjusted to that of "MugNa" 312 from that of "Steph" 314.

Figure 9:
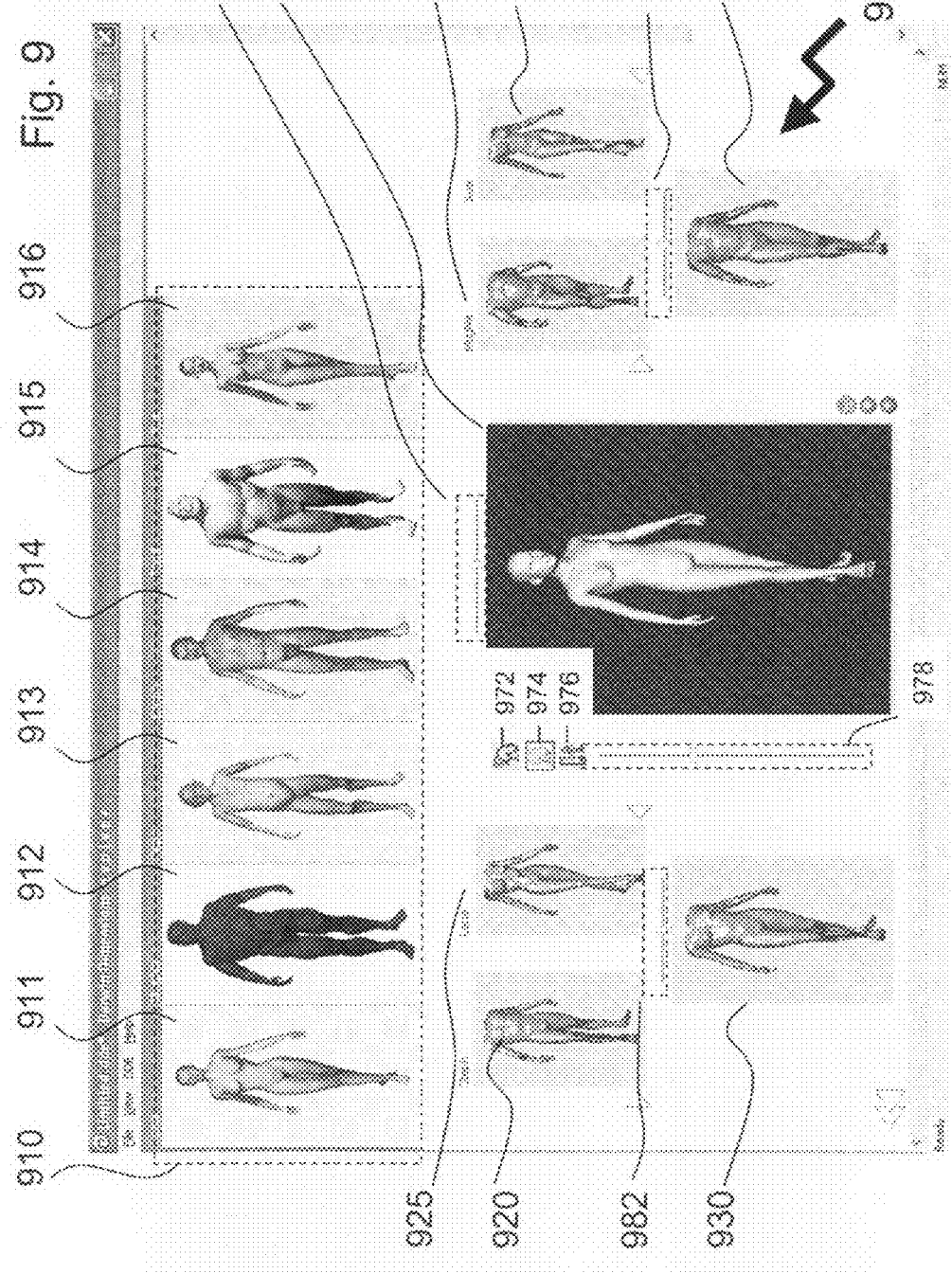
FIG. 9 illustrates an exemplary embodiment of the invention employed in generating an inheritance based avatar for a second step of the body generation.

The three-generation inheritance based avatar generator of the exemplary embodiments presented in respect of FIGS. 3 through 8 for the head of the avatar is a first step, as the avatar generator also generates a body. Referring to FIG. 9, such an exemplary second step is shown in the three-generation inheritance based avatar generator 900. Now shown to the avatar generator is the pool 910, but now each body is shown in full modesty level nudity. As such shown are "Lena" 911, "MugNa" 912, "Pepe" 913, "Steph" 914, "Todd" 915, and "Xua" 916, wherein again the avatar grandparents are "Steph" 914 as paternal grandfather 920, "Lena" 911 as paternal grandmother 925, "MugNa" 912 as maternal grandfather 940, and "Xua" 916 as maternal grandmother 945. These give rise to "Body Parent 1" 930 and "Body Parent 2" 950 in the second generation and "Off-Spring" 960, in the same manner as presented supra, using "Body Paternal Slider" 982, "Body Maternal Slider" 986 and "Body Weighting Slider" 984.

Also shown are "Body Slider" 978 and three body feature icons, "Head-Body Ratio" 972, "Scale Neck" 974, and "Height" 976. The avatar generator in selecting "Height" 976 scales the whole body of "Off-Spring" 960 across a pre-determined range defined in conjunction with the "Body Slider" 978, for example from 0.4 m (approximately 16 inches) for an infant through to 2.4 m (approximately 7 feet 10 inches). Similarly, "Scale Neck" 974 allows the avatar generator to adjust the length of the neck of "Off-Spring" 960, and "Head-Body Ratio" 972.

Figure 10:
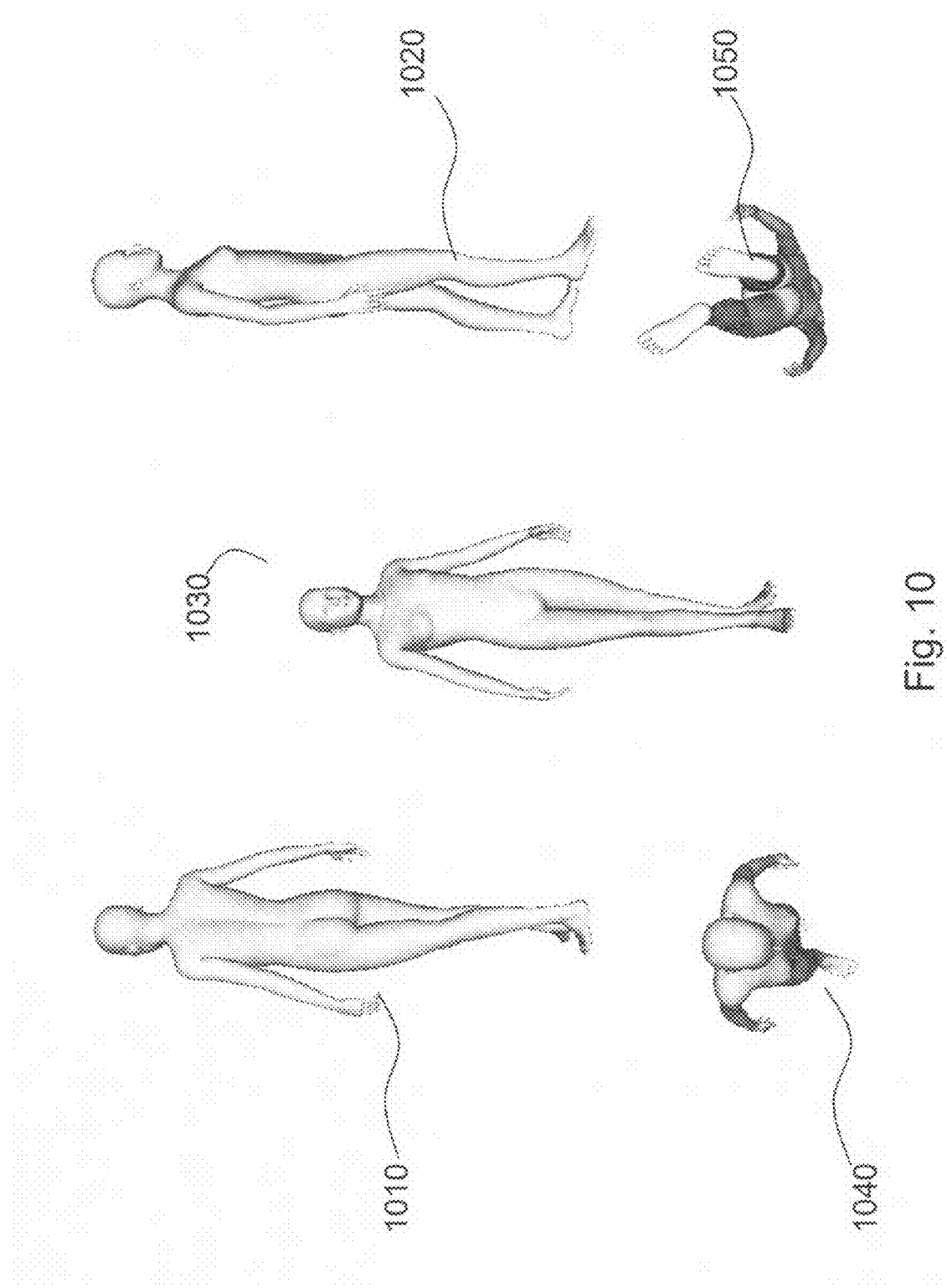
FIG. 10 illustrates an exemplary viewpoint adjustment of the inheritance based avatar generated according to an embodiment of the invention.

In viewing the "Off-Spring" 960, the avatar generator is able to rotate freely the image presented as illustrated within FIG. 10. As shown within FIG. 10 rear view 1010, side view 1020, front view 1030, bottom view 1050 and top view 1040 are optionally available. The user freely positions the avatar in any aspect to improve their view and ability to select, adjust and decide in respect of "Off-Spring" 960.

Exemplary avatars generated when the avatar generator has selected "Head-Body Ratio" 972 and manipulated "Body Slider" 978 are shown in FIG. 11. Shown on the left is "Shrunken Head" 1110 wherein the ratio of head to body has been set to a low value, i.e. small head for given body size, using the body of "Off-Spring" 960. Shown next in the middle is "Steroid Man" 1120 wherein the maternal grandfather used is "Todd" 915, the weightings favor male grandparents, and the maternal grandparents, and "Body Slider" 978 at low ratio. Finally, shown on the right is "Bloated Head" 1130 wherein "Off-Spring" 960 formed the starting avatar and "Body Slider" 978 has been adjusted to the other extreme with "Head-Body Ratio" 972 selected.

In the embodiments presented supra, the inheritance based avatar generation process has been presented in respect of a human procreation model with two parents for each off-spring and weighting applied between each pair of parents within each of the first and second generations giving rise to the third generation. Whilst the weightings applied have been discussed in respect of slider bars it would be apparent that alternative methods of user selection of the weighting are possible, including implementations of dials, knobs, etc and entry by the user of a percentage, ratio or other indicator.

Optionally, the inheritance based avatar generator may be implemented with N parents, wherein N>2, for each off-spring, and a weighting $W_m$ is provided by the user for all but one parent; i.e. providing N−1 weightings, where $$\sum_{m=1}^{N} W_m = 1.$$

The final weighting being automatically calculated. Alternatively the user may also be provided with a random weighting function, wherein a pseudo-random number generator provides the weightings for the current selection of parents. Alternatively, weightings are provided through a visual input mechanism such as a point within a circle or a sphere. Alternatively, the avatar generator selects any combination of parents, and hence whilst the embodiments supra employ human, or humanoid, parents such a limitation is only for ease of presentation and understanding. No such limitation exists for the avatar generator other than the avatars within the pool have formats compatible with the inheritance based avatar generator process.

Off-Spring avatars, which are generated using an avatar generator according to an embodiment of the instant invention, may be used to "populate" interactive or non-interactive applications, such as for instance video and computer games, on-line virtual environments for social networking or dating, movies, advertisements, etc. In the case of on-line gaming and on-line virtual environments, optionally the avatar generator is hosted on a computer system that is remote from the user, or the avatar generator is downloaded to a computer system that is local to the user. For instance, the avatar generator may be downloaded as part of the initial software download by a new user upon joining an on-line virtual environment or on-line gaming community. The parameters that define the generated Off-Spring avatar may be transferred from the user's local computer system to the local computer systems of other users that interact with the user within the virtual environment. Software that is installed on the local computer systems of the other users then generates a representation of the Off-Spring avatar, based on the parameters received from the user.

Numerous other embodiments may be envisaged without departing from the spirit or scope of the invention.

What is claimed is:

1. A method, comprising:
   receiving a selection of a plurality of paternal grandparent avatars, the plurality of paternal grandparent avatars having more than two members;
   for each paternal grandparent avatar included in the plurality of paternal grandparent avatars, setting a corresponding first weighting in a plurality of first weightings, comprising:
      receiving a first weighting for each paternal grandparent avatar included in the plurality of paternal grandparent avatars other than a first paternal grandparent avatar included in the plurality of paternal grandparent avatars,
      calculating a sum of the first weightings, and
      setting the first weighting for the first paternal grandparent avatar by subtracting the sum from one;
   receiving a selection of a plurality of maternal grandparent avatars, the plurality of maternal grandparent avatars having more than two members;
   for each maternal grandparent avatar included in the plurality of maternal grandparent avatars, setting a corresponding second weighting in a plurality of second weightings;
   receiving a family weighting that specifies a third weighting between a father avatar associated with the plurality of paternal grandparent avatars and a mother avatar associated with the plurality of maternal grandparent avatars;

generating an offspring avatar based on the plurality of first weightings, the plurality of second weightings, and the third weighting; and storing the offspring avatar on a non-transitory computer readable storage medium.

2. The method of claim 1, wherein at least one of the first weighting, the second weighting, and the family weighting includes a value within an available range of values for a first inheritable characteristic included in a plurality of inheritable characteristics, the available range of values having a first endpoint corresponding to the father avatar and having a second endpoint corresponding to the mother avatar.

3. The method of claim 1, wherein at least one of the first weighting, the second weighting, and the family weighting is based on a position of a slider bar indicating-portion that is between a first endpoint of a slider bar and a second endpoint of the slider bar.

4. The method of claim 3, further comprising displaying the slider bar disposed between displays of the simulated physical appearance of each of the father avatar and the mother avatar, such that moving the slider bar indicating-portion in a direction toward the display of the simulated physical appearance of the father avatar weights more heavily toward the father avatar, and such that moving the slider bar indicating-portion in a direction toward the display of the simulated physical appearance of the mother avatar weights more heavily toward the mother avatar.

5. The method of claim 3, wherein a first endpoint of the slider bar defines a first endpoint value corresponding to the father avatar and a second endpoint of the slider bar defines a second endpoint value corresponding to the mother avatar.

6. The method of claim 3, comprising displaying an updated simulated appearance of the offspring avatar in dependence upon the position of the slider bar indicating-portion.

7. A method, comprising:

receiving a selection of a plurality of paternal grandparent avatars, the plurality of paternal grandparent avatars having more than two members;

for each paternal grandparent avatar included in the plurality of paternal grandparent avatars, setting a corresponding first weighting in a plurality of first weightings;

receiving a selection of a plurality of maternal grandparent avatars, the plurality of maternal grandparent avatars having more than two members;

for each maternal grandparent avatar included in the plurality of maternal grandparent avatars, setting a corresponding second weighting in a plurality of second weightings, comprising:

receiving a second weighting for each maternal grandparent avatar included in the plurality of maternal grandparent avatars other than a first maternal grandparent avatar included in the plurality of maternal grandparent avatars, calculating a sum of the second weightings, and setting the second weighting for the first maternal grandparent avatar by subtracting the sum from one;

receiving a family weighting that specifies a third weighting between a father avatar associated with the plurality of paternal grandparent avatars and a mother avatar associated with the plurality of maternal grandparent avatars;

generating an offspring avatar based on the plurality of first weightings, the plurality of second weightings, and the third weighting; and storing the offspring avatar on a non-transitory computer readable storage medium.

8. The method of claim 7, wherein at least one of the first weighting, the second weighting, and the family weighting includes a value within an available range of values for a first inheritable characteristic included in a plurality of inheritable characteristics, the available range of values having a first endpoint corresponding to the father avatar and having a second endpoint corresponding to the mother avatar.

9. The method of claim 7, wherein at least one of the first weighting, the second weighting, and the family weighting is based on a position of a slider bar indicating-portion that is between opposite ends a first endpoint of a slider bar and a second endpoint of the slider bar.

10. The method of claim 9, further comprising displaying the slider bar disposed between displays of the simulated physical appearance of each of the father avatar and the mother avatar, such that moving the slider bar indicating-portion in a direction toward the display of the simulated physical appearance of the father avatar weights more heavily toward the father avatar, and such that moving the slider bar indicating-portion in a direction toward the display of the simulated physical appearance of the mother avatar weights more heavily toward the mother avatar.

11. The method of claim 9, wherein a first endpoint of the slider bar defines a first endpoint value corresponding to the father avatar and a second endpoint of the slider bar defines a second endpoint value corresponding to the mother avatar.

12. The method of claim 9, comprising displaying an updated simulated appearance of the offspring avatar in dependence upon the position of the slider bar indicating-portion.

13. A non-transitory computer-readable storage medium including instructions that, when executed by a processor, cause the processor to generate an inheritance-based avatar by performing the steps of:

receiving a selection of a plurality of paternal grandparent avatars, the plurality of paternal grandparent avatars having more than two members;

for each paternal grandparent avatar included in the plurality of paternal grandparent avatars, setting a corresponding first weighting in a plurality of first weightings, comprising:

receiving a first weighting for each paternal grandparent avatar included in the plurality of paternal grandparent avatars other than a first paternal grandparent avatar included in the plurality of paternal grandparent avatars, calculating a sum of the first weightings, and setting the first weighting for the first paternal grandparent avatar by subtracting the sum from one;

receiving a selection of a plurality of maternal grandparent avatars, the plurality of maternal grandparent avatars having more than two members;

for each maternal grandparent avatar included in the plurality of maternal grandparent avatars, setting a corresponding second weighting in a plurality of second weightings;

receiving a family weighting that specifies a third weighting between a father avatar associated with the plurality of paternal grandparent avatars and a mother avatar associated with the plurality of maternal grandparent avatars;

generating an offspring avatar based on the plurality of first weightings, the plurality of second weightings, and the third weighting; and storing the offspring avatar on a second non-transitory computer readable storage medium.

14. The non-transitory computer-readable storage medium of claim 13, wherein at least one of the first weighting, the second weighting, and the family weighting includes a value within an available range of values for a first inheritable characteristic included in a plurality of inheritable characteristics, the available range of values having a first endpoint corresponding to the father avatar and having a second endpoint corresponding to the mother avatar.

15. The non-transitory computer-readable storage medium of claim 13, wherein at least one of the first weighting, the second weighting, and the family weighting is based on a position of a slider bar indicating-portion that is between a first endpoint of a slider bar and a second endpoint of the slider bar.

16. The non-transitory computer-readable storage medium of claim 15, further comprising displaying the slider bar disposed between displays of the simulated physical appearance of each of the father avatar and the mother avatar, such that moving the slider bar indicating-portion in a direction toward the display of the simulated physical appearance of the father avatar weights more heavily toward the father avatar, and such that moving the slider bar indicating-portion in a direction toward the display of the simulated physical appearance of the mother avatar weights more heavily toward the mother avatar.

17. The non-transitory computer-readable storage medium of claim 15, wherein a first endpoint of the slider bar defines a first endpoint value corresponding to the father avatar and a second endpoint of the slider bar defines a second endpoint value corresponding to the mother avatar.

18. The non-transitory computer-readable storage medium of claim 15, comprising displaying an updated simulated appearance of the offspring avatar in dependence upon the position of the slider bar indicating-portion.

19. A non-transitory computer-readable storage medium including instructions that, when executed by a processor, cause the processor to generate an inheritance-based avatar by performing the steps of:

receiving a selection of a plurality of paternal grandparent avatars, the plurality of paternal grandparent avatars having more than two members;

for each paternal grandparent avatar included in the plurality of paternal grandparent avatars, setting a corresponding first weighting in a plurality of first weightings;

receiving a selection of a plurality of maternal grandparent avatars, the plurality of maternal grandparent avatars having more than two members;

for each maternal grandparent avatar included in the plurality of maternal grandparent avatars, setting a corresponding second weighting in a plurality of second weightings, comprising:

receiving a second weighting for each maternal grandparent avatar included in the plurality of maternal grandparent avatars other than a first maternal grandparent avatar included in the plurality of maternal grandparent avatars, calculating a sum of the second weightings, and setting the second weighting for the first maternal grandparent avatar by subtracting the sum from one;

receiving a family weighting that specifies a third weighting between a father avatar associated with the plurality of paternal grandparent avatars and a mother avatar associated with the plurality of maternal grandparent avatars;

generating an offspring avatar based on the plurality of first weightings, the plurality of second weightings, and the third weighting; and storing the offspring avatar on a second non-transitory computer readable storage medium.

20. The non-transitory computer-readable storage medium of claim 19, wherein at least one of the first weighting, the second weighting, and the family weighting includes a value within an available range of values for a first inheritable characteristic included in a plurality of inheritable characteristics, the available range of values having a first endpoint corresponding to the father avatar and having a second endpoint corresponding to the mother avatar.

21. The non-transitory computer-readable storage medium of claim 19, wherein at least one of the first weighting, the second weighting, and the family weighting is based on a position of a slider bar indicating-portion that is between opposite ends a first endpoint of a slider bar and a second endpoint of the slider bar.

22. The non-transitory computer-readable storage medium of claim 21, further comprising displaying the slider bar disposed between displays of the simulated physical appearance of each of the father avatar and the mother avatar, such that moving the slider bar indicating-portion in a direction toward the display of the simulated physical appearance of the father avatar weights more heavily toward the father avatar, and such that moving the slider bar indicating-portion in a direction toward the display of the simulated physical appearance of the mother avatar weights more heavily toward the mother avatar.

23. The non-transitory computer-readable storage medium of claim 21, wherein a first endpoint of the slider bar defines a first endpoint value corresponding to the father avatar and a second endpoint of the slider bar defines a second endpoint value corresponding to the mother avatar.

24. The non-transitory computer-readable storage medium of claim 21, comprising displaying an updated simulated appearance of the offspring avatar in dependence upon the position of the slider bar indicating-portion.

* * * * *